US006702973B2

(12) United States Patent
Servies

(10) Patent No.: US 6,702,973 B2
(45) Date of Patent: Mar. 9, 2004

(54) METHOD OF SEALING A STUD IN A BUSHING

(75) Inventor: David Servies, South Milwaukee, WI (US)

(73) Assignee: McGraw-Edison Company, Houston, TX (US)

( * ) Notice: Subject to any disclaimer, the term of this patent is extended or adjusted under 35 U.S.C. 154(b) by 0 days.

(21) Appl. No.: 10/087,017

(22) Filed: Feb. 28, 2002

(65) Prior Publication Data

US 2002/0079131 A1 Jun. 27, 2002

Related U.S. Application Data

(62) Division of application No. 09/481,015, filed on Jan. 11, 2000, now Pat. No. 6,372,994.

(51) Int. Cl.[7] ................................................ B29C 45/14

(52) U.S. Cl. .................... 264/230; 264/263; 264/271.1; 264/275; 264/342 R

(58) Field of Search ............................ 264/230, 342 R, 264/250, 263, 271.1, 275, 277; 174/152 R, 153 R, 142

(56) References Cited

U.S. PATENT DOCUMENTS

| | | | | | |
|---|---|---|---|---|---|
| 2,191,544 | A | | 2/1940 | Ruskin | |
| 2,315,623 | A | | 4/1943 | Jacobi | |
| 2,517,693 | A | | 8/1950 | Mead et al. | |
| 2,523,741 | A | | 9/1950 | Weschler et al. | |
| 2,550,112 | A | | 4/1951 | Fields | |
| 2,591,205 | A | | 4/1952 | Schoenlaub | |
| 2,669,601 | A | | 2/1954 | Johnson et al. | |
| 2,672,500 | A | | 3/1954 | Bondon | |
| 2,717,792 | A | | 9/1955 | Pelley | |
| 2,870,524 | A | * | 1/1959 | Kinnear | 29/600 |
| 3,025,201 | A | * | 3/1962 | Poemon | 156/294 |
| 3,222,625 | A | | 12/1965 | Ledocq | |
| 3,388,211 | A | | 6/1968 | Nichols et al. | |
| 3,388,212 | A | | 6/1968 | Nichols et al. | |
| 3,504,106 | A | | 3/1970 | Keto | |
| 3,531,580 | A | | 9/1970 | Foster | |
| 3,544,707 | A | | 12/1970 | Gamble | |
| 3,585,278 | A | | 6/1971 | Quirk | |
| 3,663,928 | A | | 5/1972 | Keto et al. | |
| 3,783,181 | A | * | 1/1974 | Martincic et al. | 174/142 |
| 3,803,523 | A | | 4/1974 | Farmer et al. | |
| 3,829,546 | A | | 8/1974 | Hunter et al. | |
| 3,979,549 | A | | 9/1976 | Wilkinson | |
| 4,112,043 | A | | 9/1978 | Williams | |
| 4,273,405 | A | | 6/1981 | Law | |
| 4,514,590 | A | | 4/1985 | Kyle | |
| 4,614,691 | A | | 9/1986 | Inui et al. | |
| 4,767,351 | A | | 8/1988 | Patel et al. | |
| 4,791,247 | A | | 12/1988 | Cacalloro et al. | |
| 4,956,525 | A | | 9/1990 | Wilk | |
| 5,342,998 | A | | 8/1994 | Nolte et al. | |
| 5,557,073 | A | | 9/1996 | Truesdale et al. | |
| 5,679,926 | A | | 10/1997 | Maloney et al. | |
| 5,811,728 | A | | 9/1998 | Maeda | |
| 6,064,000 | A | | 5/2000 | Kim | |
| 6,168,751 | B1 | * | 1/2001 | Delrosario et al. | 264/642 |
| 6,180,882 | B1 | | 1/2001 | Dinh | |

* cited by examiner

*Primary Examiner*—Angela Ortiz
(74) *Attorney, Agent, or Firm*—Fish & Richardson P.C.

(57) ABSTRACT

A wrapped film sealing system includes a conductive stud, a film layer wrapped around at least a portion of the length of the conductive stud, and a bushing including a channel passing between two open ends. The conductive stud passes through the channel and a seal is formed between the conductive stud, the film layer, and the bushing.

17 Claims, 10 Drawing Sheets

METHOD OF SEALING A STUD IN A BUSHING

CROSS-REFERENCE TO RELATED APPLICATIONS

This application is a divisional of U.S. Ser. No. 09/481,015, filed Jan. 11, 2000, now U.S. Pat. No. 6,372,994.

TECHNICAL FIELD

This invention relates to a wrapped film sealing system for electrical equipment.

BACKGROUND

Many types of conventional electrical equipment contain a dielectric fluid for dissipating the heat that is generated by energized components of the equipment, and for insulating those components from the equipment enclosure and from other internal parts and devices. Examples of such equipment include transformers, capacitors, regulators, circuit breakers and reclosers. Transformers are used extensively in the transmission of electrical power, both at the generating end and at the load end of the power distribution system. A distribution transformer is one that receives electrical power at a first voltage and delivers it at a second, lower voltage.

A distribution transformer consists generally of a core and conductors that are wound about the core so as to form at least two windings. The windings (also referred to as coils) are insulated from each other, and are wound on a common core of magnetically suitable material, such as iron or steel. The primary winding or coil receives energy from an alternating current (AC) source. The secondary winding receives energy by mutual inductance from the primary winding and delivers that energy to a load that is connected to the secondary winding. The core provides a circuit or path for the magnetic lines of force (magnetic flux) which are created by the alternating current flow in the primary winding and which induce the current flow in the secondary winding. The core and winding are typically retained in an enclosure for safety and to protect the core and coil assembly from damage caused by weather or vandalism.

Transformers generate heat during operation through (1) electrical resistance in the conductors that constitute the windings, (2) alternating magnetic flux generating current flow in the core material as the flux passes through the core, and (3) hysteresis (i.e., the friction between the magnetic molecular particles in the core material as they reverse their orientation within the core steel, which occurs when the direction of the AC magnetic field reverses). The generated heat reduces transformer life by degrading the insulation of various internal components, which can lead to an internal fault or short circuit. To dissipate the heat, transformers may be filled with a dielectric coolant, which also functions to electrically insulate the transformer components from one another and from the enclosure.

An electrical connection is formed from the inside of the transformer to the outside using an electrical bushing, such as an insulated component bushing well or tri-clamp bushing. The bushing must provide a seal through an internal stud or components and an external flange. The external flange is sealed by additional gasket components or welding to the flanges.

SUMMARY

In one general aspect, a wrapped film sealing system includes a conductive stud, a film layer wrapped around at least a portion of the length of the conductive stud, and a bushing well including a channel passing between two open ends. The conductive stud passes through the channel and a seal is formed between the conductive stud, the film layer, and the bushing.

Embodiments may include one or more of the following features. For example, the conductive stud may include a knurled portion and the film layer may be wrapped around the knurled portion. The knurled portion may include knurled surfaces interspersed with smooth surfaces. The conductive stud may include a smooth portion and the film layer may be wrapped around a portion of the smooth portion. The film layer may include an adhesive layer, such as a heat shrinkable plastic. The film layer also may include a thermoplastic.

The bushing may include a thermoplastic, which may be a nylon. The bushing also may include a thermoset material. The bushing may be a bushing well or a tri-clamp bushing. The conductive stud in the channel in the bushing well may be a removable conductive stud.

In another general aspect, a method of sealing a stud in a bushing includes providing a conductive stud and a film. The film is wrapped around a circumference of the stud along at least a portion of a length of the stud, and the wrapped stud is inserted into a molding machine into which a plastic is then injected. The plastic defines a bushing having a channel through which the stud and film extend. The plastic also bonds to the film such that the film forms a seal in the channel between the stud and bushing.

Embodiments may include one or more of the following features. For example, the method may further include heating the film wrapped around the stud before inserting the stud into the molding machine, such that heating the wrapped film shrinks the wrapped film around the stud. The wrapped film may include an adhesive layer and a heat shrinkable plastic, such as a thermoplastic. The plastic also may include a thermoplastic, which may be nylon, or a thermoset material. The molding machine may be an injection molding machine or a transfer molding machine.

Inserting the stud into the molding machine may include inserting the stud into a mold and placing the mold in the molding machine. The portion of the length of the stud may include a knurled section, with the film being wrapped around the knurled section. The knurled section may include knurled surfaces interspersed with smooth surfaces. The bushing may be a bushing well or a tri-clamp bushing.

The wrapped film sealing system provides considerable advantages. For example, the system may be used to provide a seal between a conductive stud and a bushing to prevent leakage of dielectric fluid. The wrapped film layer can compensate for the difference in thermal expansion between the conductive stud and the plastic bushing, which improves the reliability of the seal.

Conventionally, the seal is provided by spraying an adhesive on the conductive stud and then the bushing is injection molded around the stud. The adhesive may include a solvent that contains potentially environmentally harmful organic solvents that are released into the atmosphere during the spraying step. After the adhesive is applied to the stud, it is baked to cure the adhesive and bond the adhesive to the stud. The wrapped film sealing system advantageously avoids use of potentially harmful solvents, and also avoids the time and expense of baking, thereby resulting in a less complex and much cleaner process.

Other features and advantages will be apparent from the following description, including the drawings, and from the claims.

DESCRIPTION

Figure 1:
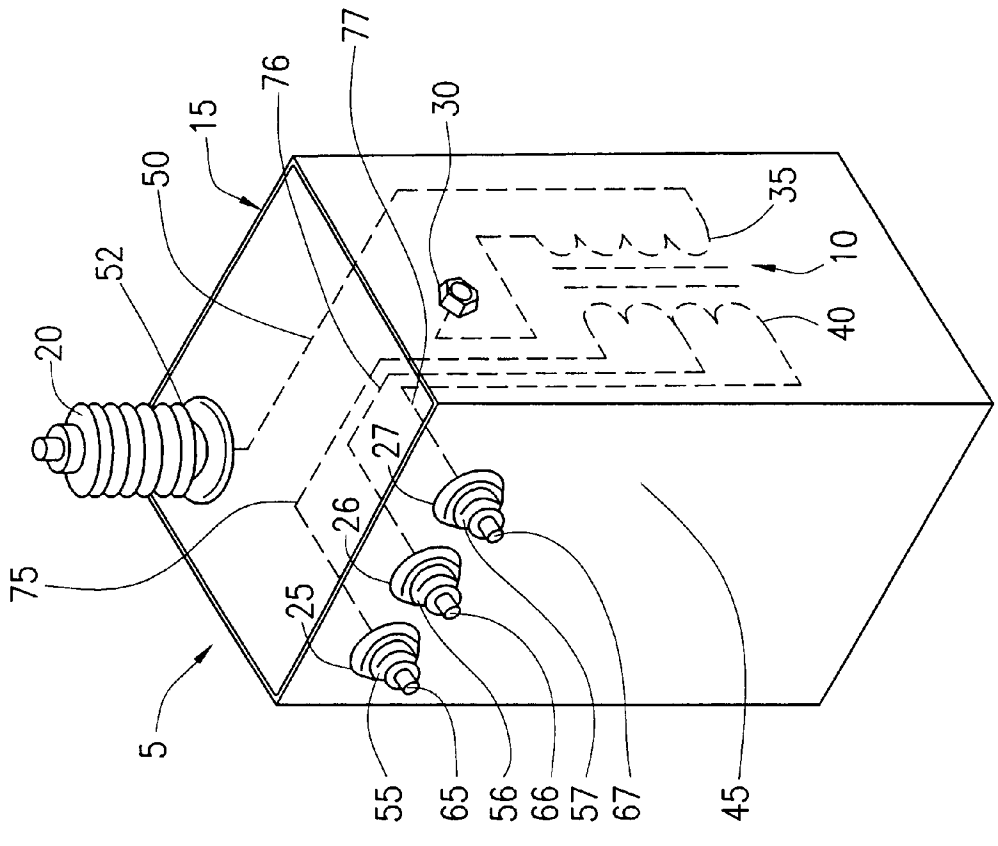
FIG. 1 is a perspective view of an electrical transformer.

Referring to FIG. 1, a transformer 5 includes a core and coil assembly 10 (shown schematically in FIG. 1), an enclosure 15, a high voltage bushing 20, low voltage bushings 25, 26, 27, and a ground lug 30. The core and coil assembly 10 is positioned within enclosure 15 and includes a primary winding 35 and a secondary winding 40. A dielectric fluid 45 fills enclosure 15 and surrounds the core and coil assembly 10. Bushings 20 and 25–27 may be made of an insulative material, such as a polymer.

Figure 2:
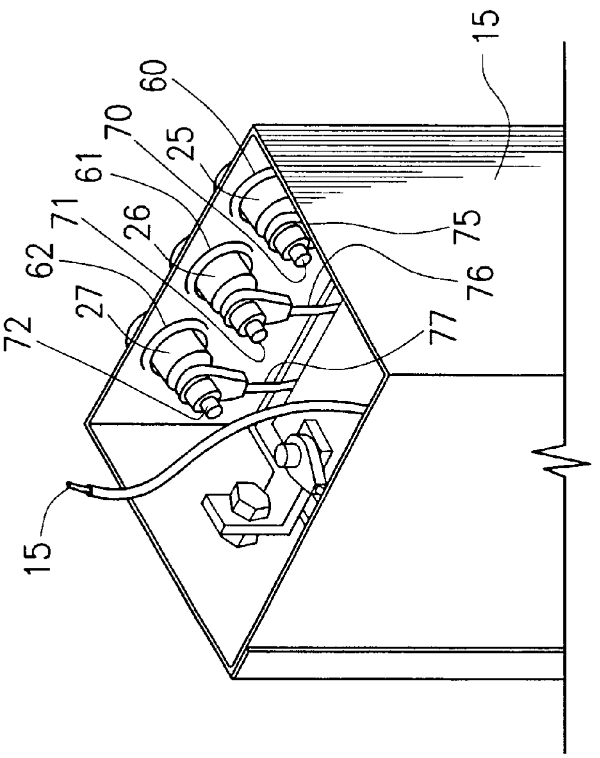
FIG. 2 is a perspective view showing a core and coil assembly mounted within the transformer of FIG. 1 and connected to secondary terminals.

Referring also to FIG. 2, a transformer primary lead 50 interconnects primary winding 35 with high voltage bushing 20, which is sealingly mounted to enclosure 15 through an aperture 52 in the enclosure. Low voltage bushings 25, 26, 27 are constructed and sealingly attached to enclosure 15. Bushings 25, 26, 27 include insulative bodies 55–57, which extend through apertures 60–62 in the enclosure 15. Bushings 25, 26, 27 further include conductive studs 65–67 and terminal end caps 70–72. Secondary leads 75–77 connect the secondary winding 40 to conductive studs 65–67.

Figure 4:
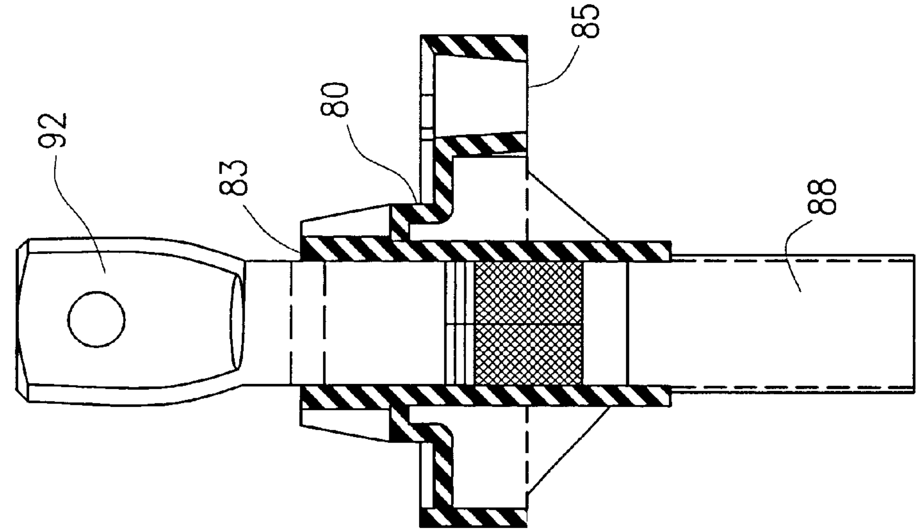
FIGS. 3–6 are cross-sectional front views of a conductive stud in a tri-clamp bushing.
Figure 3:
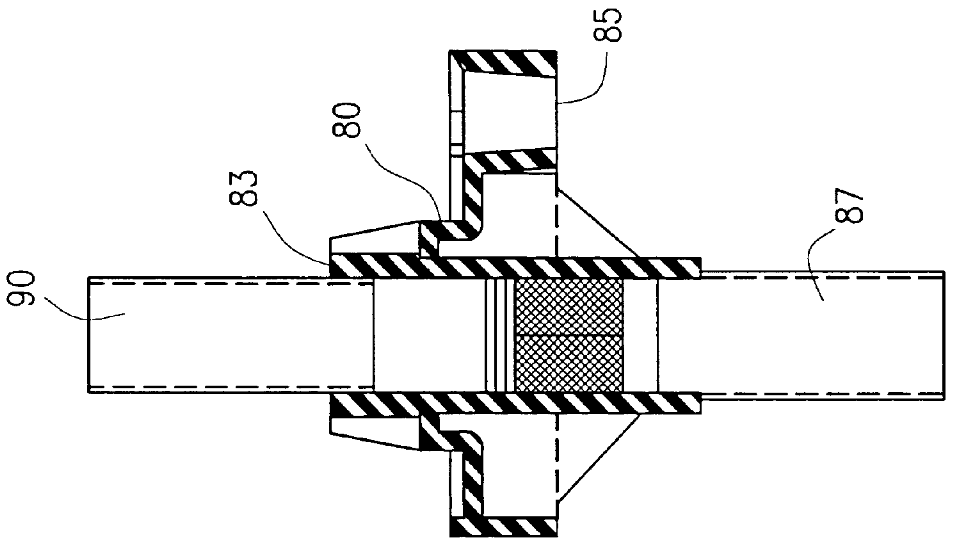

Referring to FIGS. 3 and 4, the low voltage bushings 25, 26, 27 can be implemented, for example, as tri-clamp bushings. FIGS. 3 and 4 illustrate one example of a tri-clamp bushing design. A tri-clamp bushing 80 includes a channel 83 and a mounting flange 85. The tri-clamp bushing 80 is mounted through one of apertures 60–62 (FIG. 2), and forms a seal between mounting flange 85 and the edge of the aperture through which it is mounted. A conductive stud passes through channel 83 and forms a seal with the tri-clamp bushing. A conductive stud 87 differs from a conductive stud 88 in the configuration of the outside end. Stud 87 has a round end 90 whereas stud 88 has a flat end 92. The outside end is connected to a wire that delivers high voltage electricity to the transformer 5.

Figure 6:
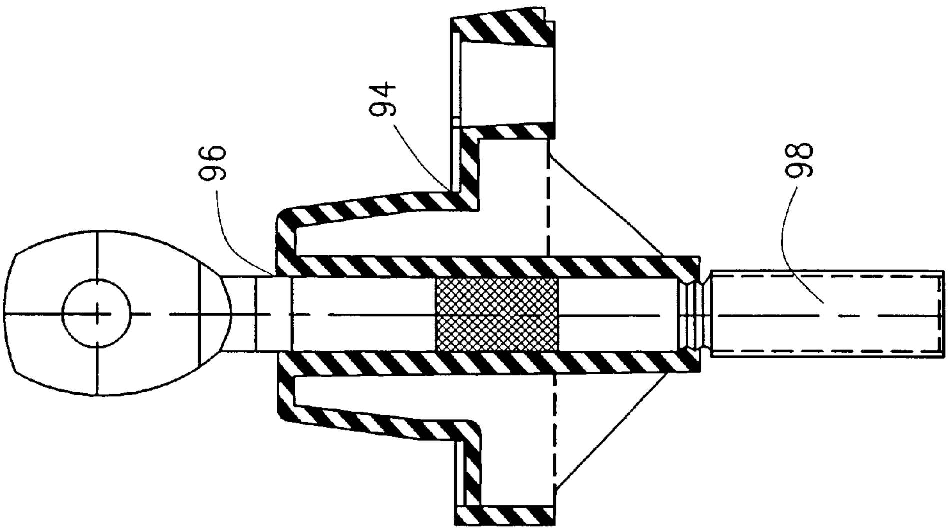
Figure 5:
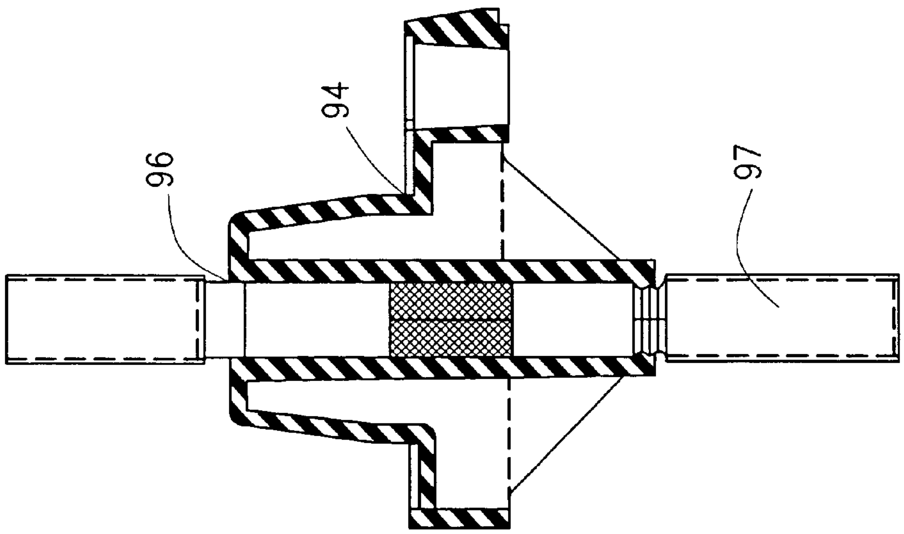

The tri-clamp bushing 94 of FIGS. 5 and 6 differs from the tri-clamp bushing 85 of FIGS. 3 and 4 in the configuration of a channel 96 that has a reduced diameter to accommodate a narrow diameter stud. Like studs 87 and 88, narrow diameter studs 97 and 98 differ in their outside ends. Stud 97 has a round outside end whereas stud 98 has a flat end. Conductive studs 87, 88, 97 and 98 are mounted in tri-clamp bushings 83 and 96, respectively, such that a seal between the stud and tri-clamp bushing prevents the dielectric fluid from leaking out of the transformer enclosure 15 through the channel in the tri-clamp bushing.

Figure 7:
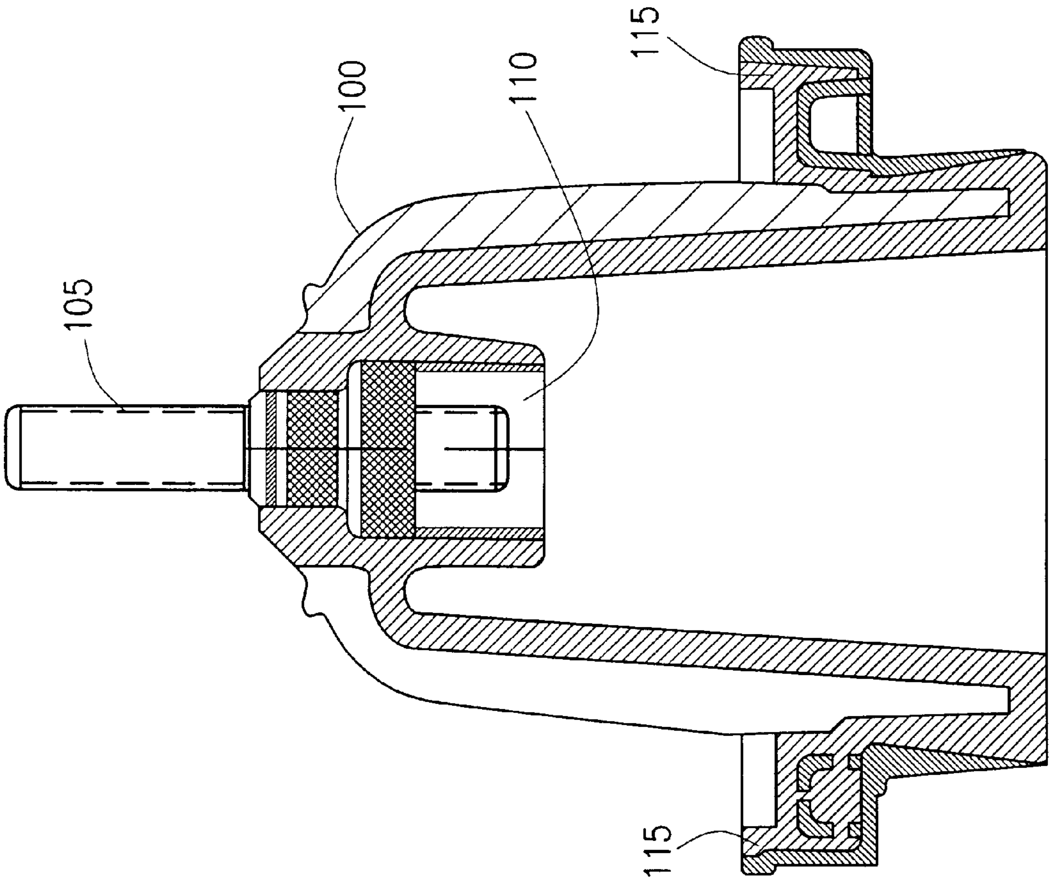
FIGS. 7 and 8 are cross-sectional front views of a conductive stud in a bushing well.
Figure 8:
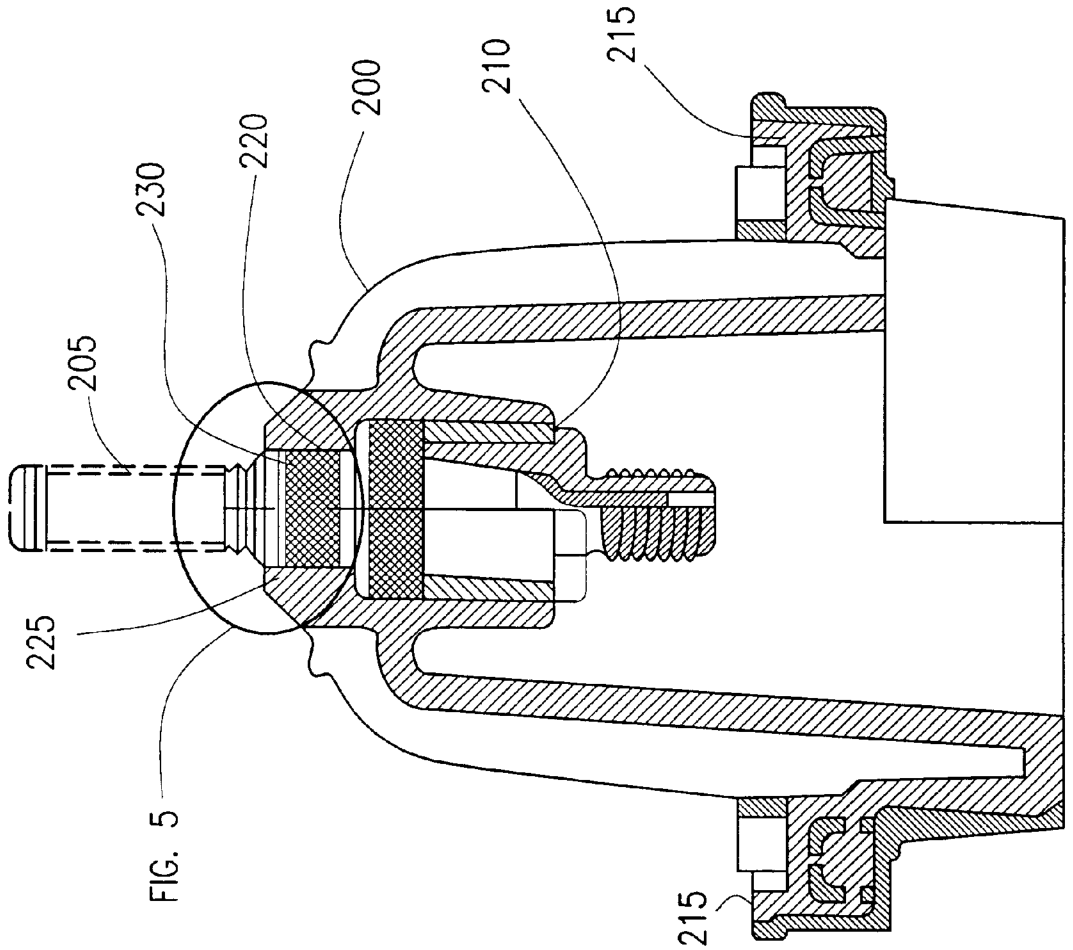

Referring to FIGS. 7 and 8, high voltage bushing 20 can be implemented, for example, as a bushing well. FIGS. 7 and 8 illustrate two different bushing well designs. FIG. 7 illustrates a bushing well 100 that includes a conductive stud 105 passing through a channel 110 in the bushing well. Bushing well 100 is mounted through aperture 52 (FIG. 1), and forms a seal between mounting flange 115 and the edge of the aperture through which it is mounted. The seal prevents dielectric fluid 45 from leaking out of the transformer enclosure 15. Referring also to FIG. 8, another design of a bushing well 200 includes a conductive stud 205 passing through a channel 210 in the bushing well. Like bushing well 100, bushing well 200 is mounted through aperture 52, and forms a seal between a mounting flange 215 and the edge of the aperture through which the bushing well 200 is mounted to prevent dielectric fluid 45 from leaking out of the transformer enclosure 15. Bushing well 200 differs from bushing well 100 in that the mounting flanges 115 and 215 differ, the bushing wells are designed to receive conductive studs of different shapes, and the stud 105 of the bushing well 100 is fixed whereas the stud 205 of the bushing well 200 is removable.

Conductive studs 105 and 205 are mounted into bushing wells 100 and 200, respectively, such that a seal between the stud and the bushing well prevents the dielectric fluid from leaking out of the transformer enclosure 15 through the channel in the bushing well. Referring to FIG. 8 for exemplary purposes, a seal 220 is formed between a knurled portion 225 of the conductive stud 205 and the channel 210. Similar seals are formed in tri-clamp bushings 83 and 94 between the respective studs and channels.

Figure 9:
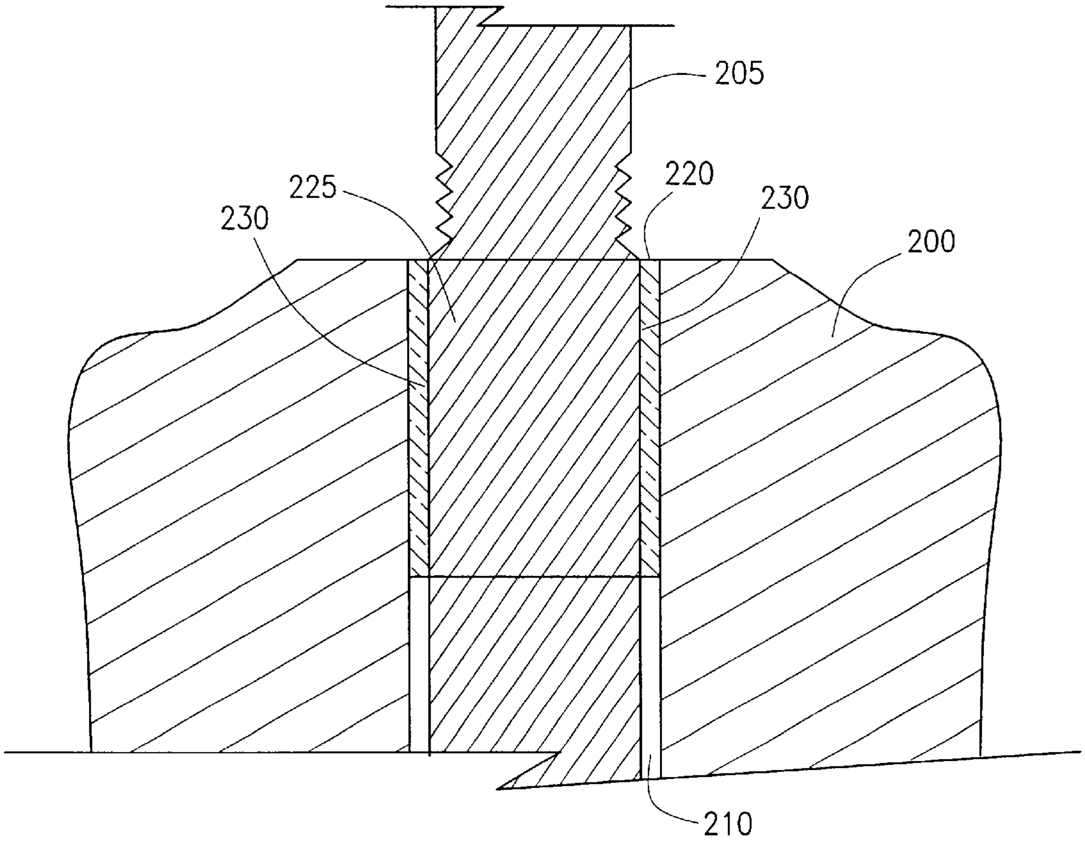
FIG. 9 is an enlarged cross-section front view showing a seal between the conductive stud and bushing of FIGS. 7 and 8.

Referring also to FIG. 9, seal 220 includes a film layer 230 surrounding the knurled portion 225 and contacting the inner diameter of channel 210. The film layer is bonded to the bushing well and may be bonded and/or tightly adhered to the conductive stud. The film compensates for the difference in thermal expansion between the stud and the bushing well to maintain the integrity of the seal during the different transformer environmental conditions that occur within the transformer during its use. Although FIG. 9 shows the film layer 230 surrounding only the knurled portion 225, the film layer 230 can surround other portions of the conductive stud, and can be bonded or adhered to the channel.

Figure 10:
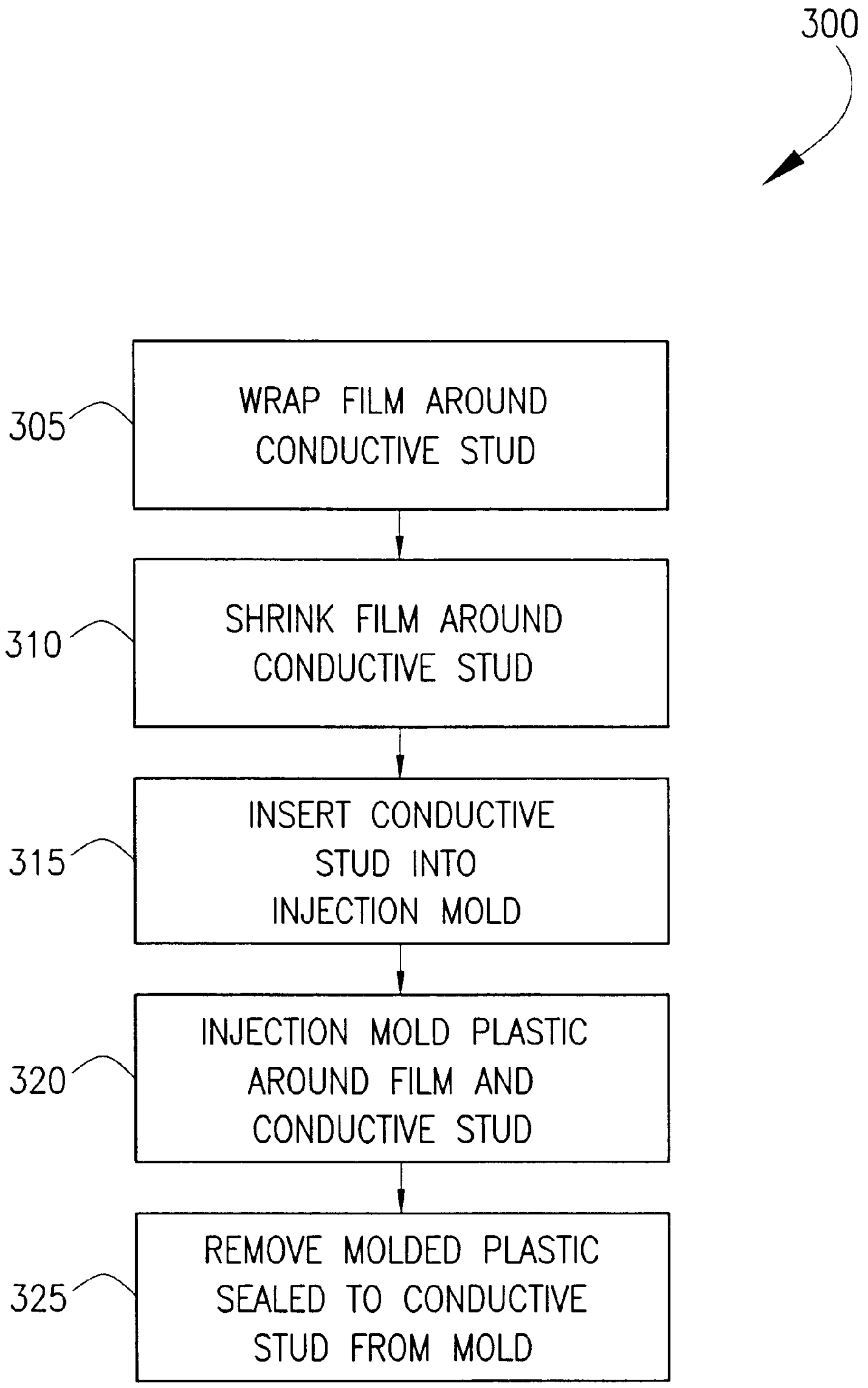
FIG. 10 is a flow chart of the steps used to form the seal between a conductive stud and bushing.
Figure 14:
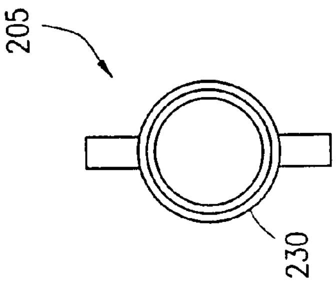
FIGS. 11–14 are front and end views of a conductive stud wrapped with a film layer before and after application of heat to the conductive stud and film layer.
Figure 13:
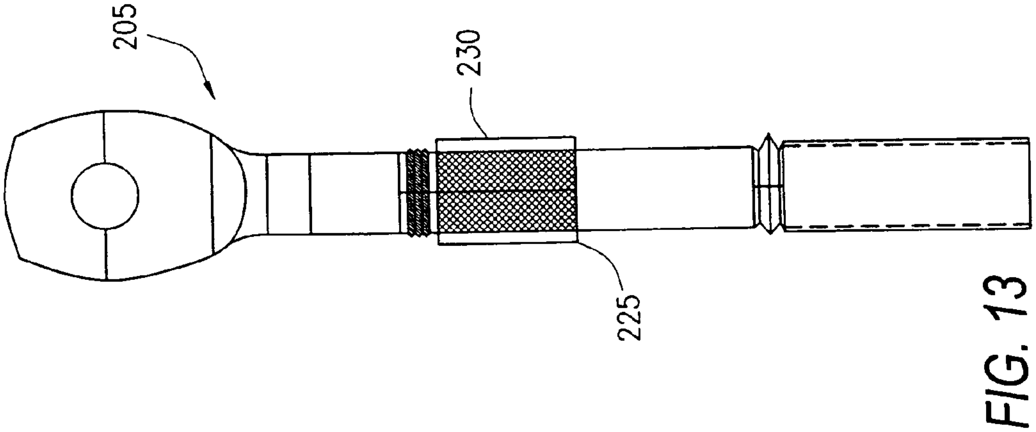
Figure 12:
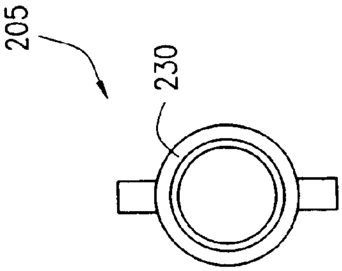
Figure 11:
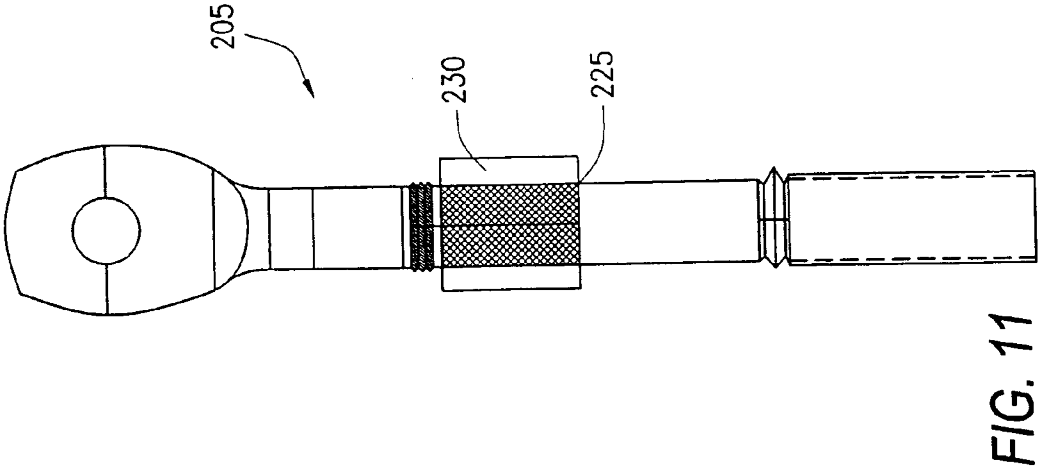

Referring to FIG. 10, film layer 230 is attached to the stud 205 and the seal 220 is formed in a multi-step fabrication process 300. As illustrated in FIGS. 11 and 12, the film layer 230 is wrapped at least once around the entire diameter of the conductive stud 205 at knurled portion 225 (step 305). The film layer 230 may overlap itself and be wrapped more than once around the conductive stud 205. Referring also to FIGS. 13 and 14, heat is optionally applied to the film layer 230 to cause it to shrink down around the stud 205 (step 310), which reduces the outer diameter of the film layer 230 and creates a seal between the tape and stud. Heat may be applied to shrink the film by using a heat gun or other heat device. Heating the film also may cause the film to bond to the conductive stud, which improves the seal between the tape and the stud.

The conductive stud 205 then is inserted into an injection mold or transfer mold(step 315), which is placed into an injection or transfer molding machine. A plastic or thermoset material then is injected into the mold around the conductive stud 205 and film layer 230 to form the bushing well 200 (step 320). Injection molds, transfer molds and the processes of injection and transfer molding are well-known in the art. The molded plastic bonds to the film layer and, because the molded plastic heats the film layer, bonds the film layer to the stud. Consequently, the film layer creates the seal 230 between the stud and bushing well 200 to prevent dielectric fluid 45 from passing through channel 210. After the plastic has cooled sufficiently, the bushing well 200 can be removed from the mold (step 325) and installed in the transformer enclosure 15.

Figure 15:
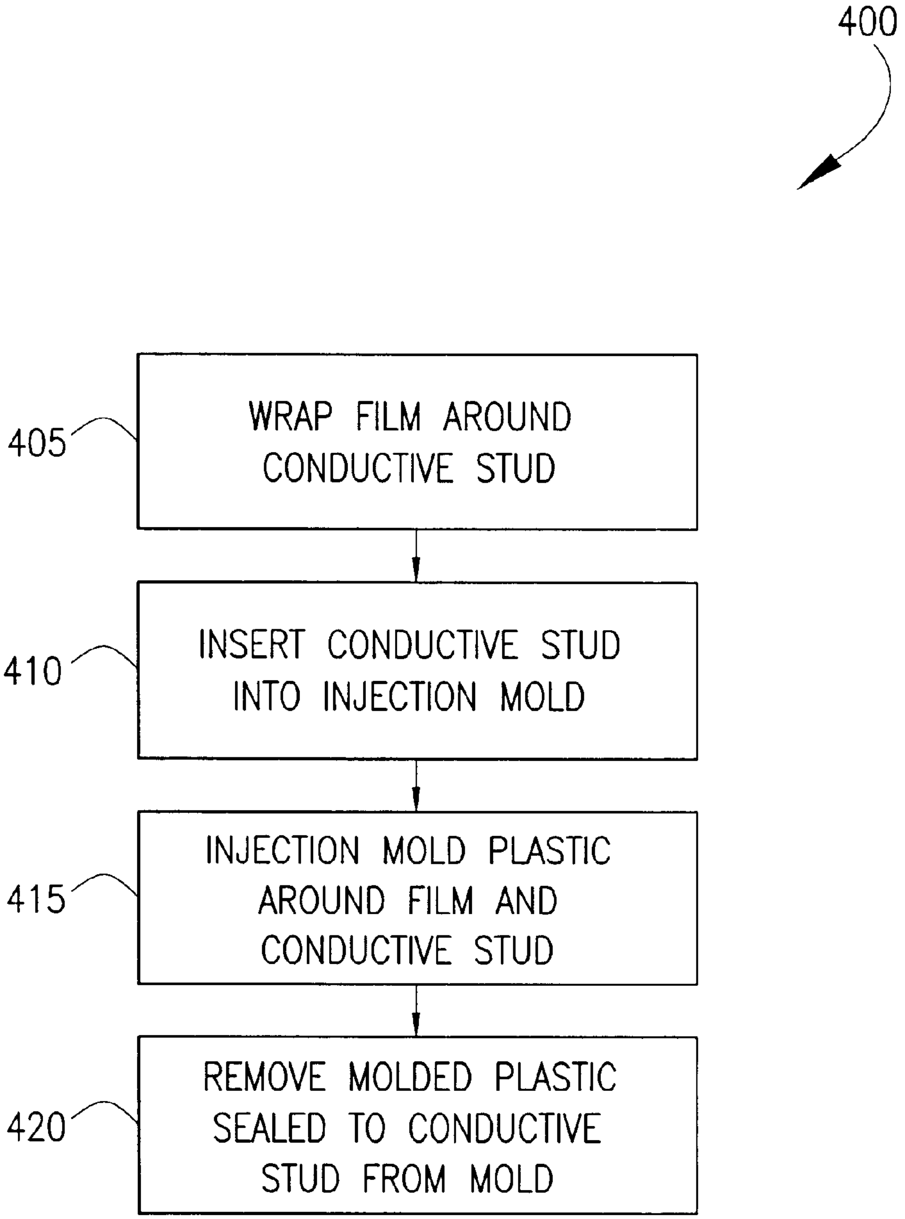
FIG. 15 is a flow chart of the steps used to form the seal between a conductive stud and bushing when a separate heat treatment step is omitted.
Figure 19:
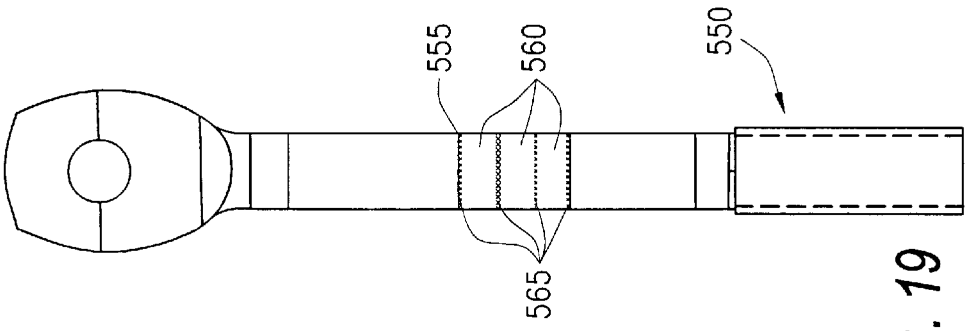
FIGS. 16–19 are front views of conductive studs having various configurations of knurled and smooth section to which a film layer is wrapped.

The process 300 of FIG. 10 typically is applicable for using film layers in which neither side has an adhesive backing. By heating and shrinking the film around the conductive stud, the film is adhered to the stud so that it can be further processed without the concern that the tape may unwind and separate from the stud before the bushing well (or tri-clamp bushing) is formed around it. If, on the other hand, the film includes an adhesive backing on one or both sides, there is less concern that the tape will loosen and separate from the stud in the later processing steps. With such a tape, the heating step can be omitted, as illustrated in a process 400 of FIG. 15.

In process 400, the film layer is wrapped around the conductive stud (step 405) as described above with respect to step 305 except that the tape adheres to the stud. The conductive stud and tape then are inserted into the injection mold (step 410), which is inserted into the injection molding machine and a plastic material injected into the mold (step 415). As described above with respect to the process 300, the film layer is heated by the injection molded plastic. Because the film layer has not been shrunk around the conductive stud in process 400, the heat of the injection molded plastic causes the film layer to shrink around the conductive stud and potentially bond to the stud.

Processes 300 and 400 can be modified in various manners. For example, although processes 300 and 400 are described and illustrated in terms of wrapping the film layer around the knurled portion of the conductive stud, the film layer may be wrapped around other portions of the conductive stud. The position of the film layer must be such that the injection molded plastic will contact and bond with the film layer. In general, it is easier to wrap the film around a smooth surface on the conductive stud but the film fills the crevices formed in a knurled surface, potentially providing a better bond between the film and stud.

Figure 18:
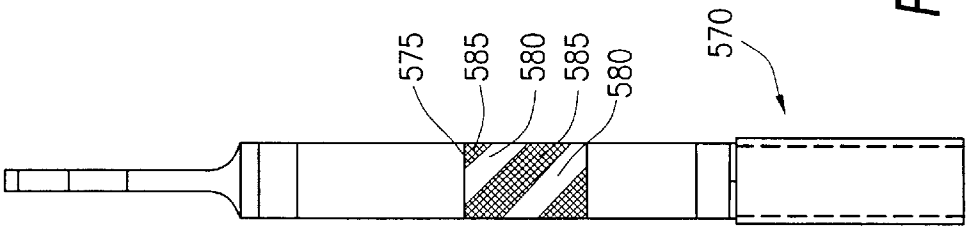
Figure 17:
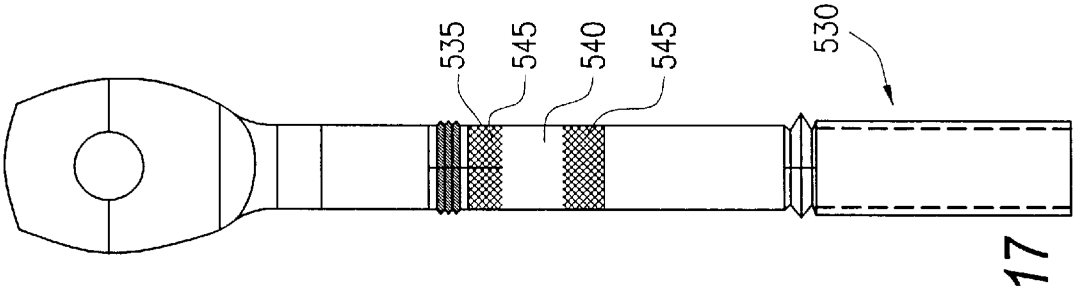
Figure 16:
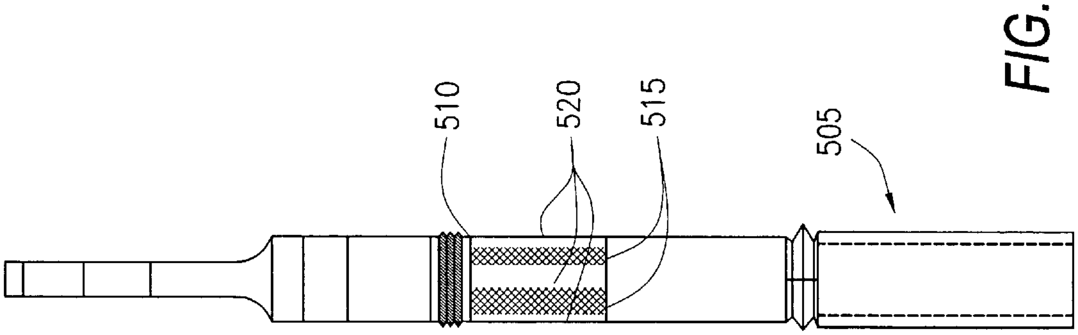

Although the conductive stud illustrated above included a knurled section only, various configurations are possible. Referring to FIGS. 16–19, the surface to which the film is to be applied may have a number of configurations of smooth and knurled sections. For example, referring to FIG. 16, stud 505 has a surface 510 that is a combination of longitudinal knurled sections 515 and smooth sections 520. As explained above, typically the film layer will be easier to apply to the smooth sections 520 but will fill the crevices in the knurled sections 515. Referring to FIG. 17, a stud 530 has a surface 535 that is a combination of a circumferential smooth section 540 between a pair of circumferential knurled sections 545. Referring to FIG. 18, in a related configuration, a stud 550 has a surface 555 with multiple circumferential smooth sections 560 separated by multiple circumferential knurled sections 565. Finally, referring to FIG. 19, a stud 570 has a surface 575 with alternating helical smooth sections 580 and knurled sections 585.

With respect to the selection of materials, typically, the injection or transfer molded plastic will be a thermoplastic, such as Zytel HTN™, a high temperature polyphthalamide; Crastin™, a polybutylene terephthalate; or Rynite™, a polyethylene terephthalate. Each of these thermoplastic materials is sold by E.I. Du Pont de Nemours & Co. of Wilmington, Del. The injection or transfer molded plastic also may be a thermoset plastic, such as E8353-706R or E8398, which are epoxidized novolac molding compounds sold by Rogers Corporation of Rogers, Conn.

The film typically also will be a thermoplastic, such as the film sold under the trade name Surlyn™, which is marketed by E.I. Du Pont de Nemours & Co. of Wilmington, Del. The film also may be a polytetrafluoroethylene film or tape, such as the PTFE tapes and films sold by 3M and E.I. Du Pont de Nemours & Co. The tape may be formed with or without glass fibers and adhesive backings. The dimensions of the film, for example, may be one inch wide, five inches long, and have a thickness of approximately 2.0 mils. The film also may be an adhesive thermoplastic tape that adhesively bonds to the conductive stud. The conductive stud may be made from any electrically conductive material, such as copper or aluminum.

Other embodiments are within the scope of the following claims.

What is claimed is:

1. A method of sealing a stud in a bushing, the method comprising:

providing a conductive stud;

providing a film, wherein the film comprises a heat shrinkable plastic such that the film shrinks around the stud in response to application of heat such that the film applies a compressive force to the stud even after removal of the heat;

wrapping the film around a circumference of the stud along at least a portion of a length of the stud;

inserting the stud into a molding machine; and injecting a plastic into the molding machine, wherein the plastic defines a bushing having a channel through which the stud and film extend and the plastic bonds to the film such that the film forms a seal in the channel between the stud and the bushing.

2. The method of claim 1, further comprising heating the film wrapped around the stud before inserting the stud into the injection molding machine, wherein heating the wrapped film shrinks the wrapped film around the stud.

3. The method of claim 1, wherein the wrapped film comprises an adhesive layer.

4. The method of claim 1, wherein the film comprises a thermoplastic.

5. The method of claim 1, wherein the plastic comprises a thermoplastic.

6. The method of claim 5, wherein the thermoplastic comprises nylon.

7. The method of claim 1, wherein the plastic comprises a thermoset material.

8. The method of claim 1, wherein inserting the stud into the molding machine comprises inserting the stud into a mold and placing the mold in the molding machine.

9. The method of claim 1, wherein the molding machine comprises an injection molding machine.

10. The method of claim 1, wherein the molding machine comprises a transfer molding machine.

11. The method of claim 1, wherein the portion of the length of the stud includes a knurled section and the film is wrapped around the knurled section.

12. The method of claim 11, wherein the knurled section comprises knurled surfaces interspersed with smooth surfaces.

13. The method of claim 1, wherein the portion of the length of the stud includes a smooth section and the film is wrapped around the smooth section.

14. The method of claim 1, wherein the bushing comprises a bushing well.

15. The method of claim 14, wherein the conductive stud in the channel in the bushing well comprises a removable conductive stud.

16. The method of claim 1, wherein the bushing comprises a tri-clamp bushing.

17. The method of claim 1, wherein injecting a plastic comprises injecting a plastic at a temperature such that heat from the plastic causes the film to bond to the conductive stud.

* * * * *